United States Patent [19]

Lecordier

[11] 4,045,035
[45] Aug. 30, 1977

[54] INFLATABLE LIP SEAL FOR PIPES

[75] Inventor: Michel G. Lecordier, Marseille, France

[73] Assignees: Compagnie Francaise des Petroles, Paris Cedex; Etudes Petrolieres Marines, Paris; Ateliers et Chantiers de Bretagne, Nantes; Compagnie Maritime D'Expertises, Marseille; Compagnie Generale Pour Les Developpements Operationnels, Paris; Entreprise de Recherches et d'Activites Petrolieres, Paris Cedex, all of France

[21] Appl. No.: 696,442

[22] Filed: June 15, 1976

[30] Foreign Application Priority Data

June 20, 1975 France .............................. 75.19367

[51] Int. Cl.² .............................................. F16J 15/46
[52] U.S. Cl. ...................................... 277/34.3; 277/75
[58] Field of Search ................. 277/34.3, 34, 9, 9.5, 277/75, 79, 71

[56] References Cited

U.S. PATENT DOCUMENTS 2,943,874   7/1960   Valdi et al. ..................... 277/34.3
3,337,222   8/1967   Smith et al. .................... 277/34.3

Primary Examiner—Richard E. Aegerter
Assistant Examiner—L. Footland
Attorney, Agent, or Firm—Sughrue, Rothwell, Mion, Zinn and Macpeak

[57] ABSTRACT

A lip-seal for sealing the junction between two parts includes a body for mounting on one part, a sealing lip extending therefrom for application against the other part, and an inflatable chamber defined between the body, the lip and a diaphragm extending between, and connected to, the lip and the body, the arrangement being such that on inflation of the chamber the profile of the lip is modified so that it is moved away from the other part to permit the other part to be assembled with the one part without damage to the lip seal and without premature application of the lip to the other part.

13 Claims, 3 Drawing Figures

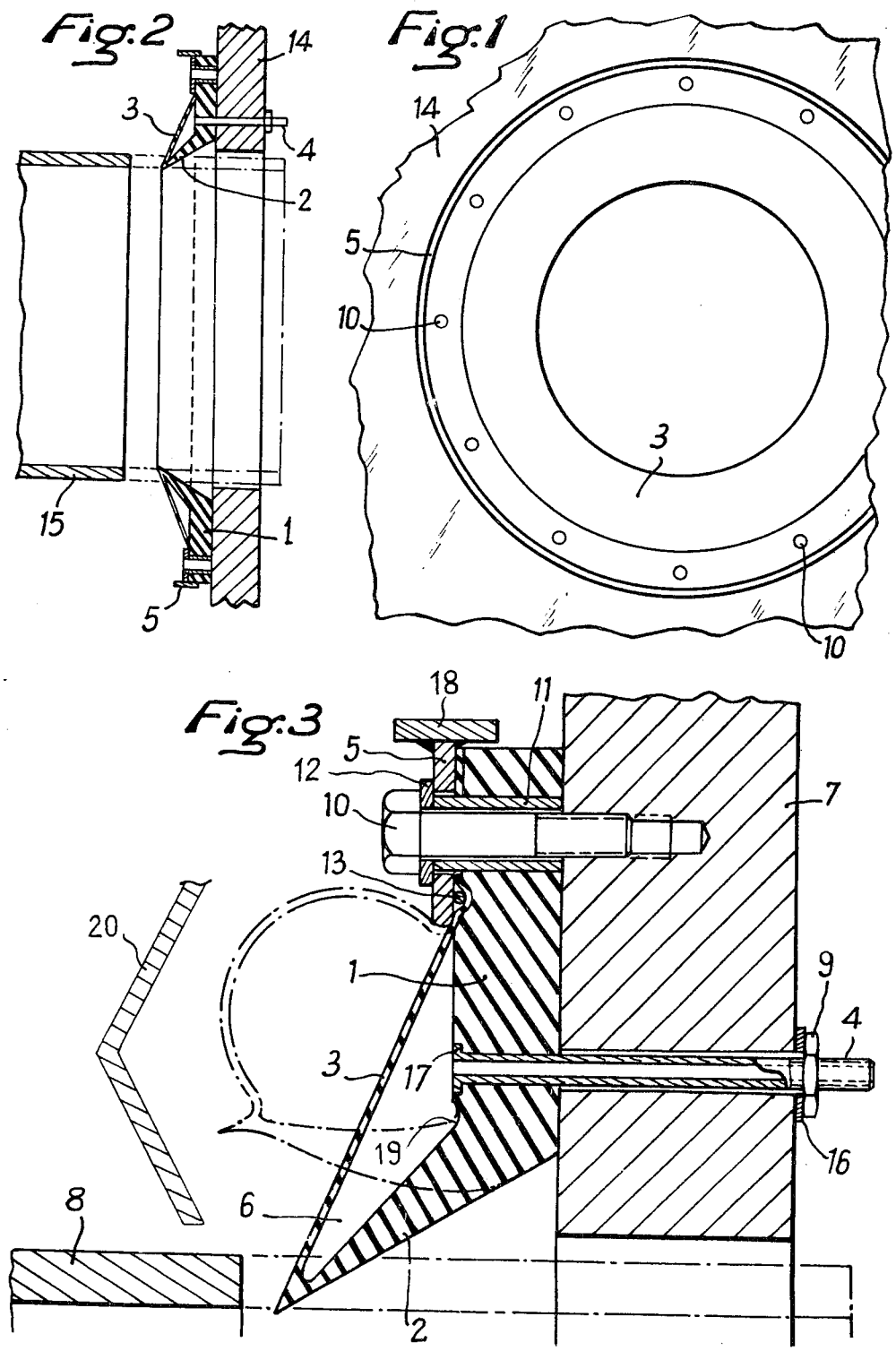

INFLATABLE LIP SEAL FOR PIPES

The invention relates to improvements in lip-seals.

In general, a conventional lip-seal to be arranged round a fixed or moving pipe or shaft has an inside diameter slightly smaller than the outside diameter of the pipe or the shaft round which sealing is being sought. The result is that the positioning of such a seal is tricky and necessitates the taking of precautions which makes the operation a relatively long one.

Such an operation is consequently still more difficult when the seal is to be placed in position round a pipe or a shaft which is already in a high pressure medium any infiltration of which must be avoided. Under such conditions, even when one has succeeded by any known method in introducing the edges of the pipe or shaft inside the lip, the lip fattens itself against the edges, thus prohibiting any suitable lapping of the lip over the tube.

According to the invention there is provided a lip-seal for sealing the junction between two parts and comprising a body for mounting on one part adjacent the junction to be sealed, a sealing lip extending from said body for sealing against the other part and means defining an inflatable chamber which when inflated modifies the profile of said lip and moves its peripheral edge away from the other part.

Preferably the lip-seal includes a diaphragm fast with said peripheral edge of said lip and with said body, said inflatable chamber being defined between said diaphragm, said lip and said body.

The invention will be more fully understood from the following description of an embodiment thereof, given by way of example only, with reference to the accompanying drawing.

In the drawing:

FIG. 1 is the plan of an embodiment of lip-seal according to the invention;

FIG. 2 is an axial section of the seal of FIG. 1 on its support; and

FIG. 3 is a detail of the seal of FIG. 1 in axial section in its normal position and in its inflated position.

As shown in FIG. 1 the lip-seal is mounted on a supporting part 14. The seal comprises an annular body 1 having a lip 2 extending from its inner periphery, the lip 2 being bounded by two conical surfaces, and a diaphragm 3 extending from the free periphery of the lip to the zone of attachment of the annular body 1 to the part 14 to be sealed. The part 14 may be for example a tank, tube, flange, dam, and consequently has been only partially represented.

Although the annular body 1 may be attached to the supporting part 14 simply by gluing, the fastening shown in greater detail in FIG. 3 is preferably employed. As shown a fixing-plate 5 enables the annular body 1 to be tightened against the supporting part 7, FIG. 3, or 14, FIG. 1, by means of bolts 10 passing through washers 12 and sleeves 11 with the supporting part. In this manner perfect tightness of the seal against its support is ensured. The fixing-plate 5 may also include a rim 18 which is intended to support the seal over the whole of its periphery as shown in FIG. 3.

The seal is moulded to provide the passageways for the bolts 10 as well as the passageway for a connection 4 which opens at 17 into the annular chamber 6 formed by the body 1, the lip 2 and the diaphragm 3. The connection 4 passes through the support 7 and may be fixed by means of a nut 9 and washer 16. The diaphragm 3 is moulded integrally with the body 1 and lip 2 and attached by moulding to the lip 2. The diaphragm preferably extends to the periphery of the annular body 1 so that during mounting of the clamping-plate 5 the diaphragm 3 can be held solidly thereby against the body 1. In order to improve the anchorage of the diaphragm 3 at the edge of the annular chamber 6, a ring 13 may be located between the plate 5 and the diaphragm 3.

The operation of the inflatable lip-seal may be started at any time. As shown in FIG. 2 the pipe 15 has to be introduced into the seal. The lip 2 is first enlarged by introduction of any inflating fluid, a gas or a liquid, into the annular chamber 6, FIG. 3, via the connection 4. The chamber 6 deforms under the effect of the pressure exerted by the fluid, for example compressed air, and tends to approach a torus, as shown in dotted lines in FIG. 3. The inside diameter of the seal thus becomes greater than the outside diameter of the pipe 15 so that the pipe can be easily introduced into the seal, entry of the pipe 15 being effected as far as the required place. It is then sufficient to let the pressure drop to bring the lip 2 back towards its original state and hence to apply it to any predetermined place on the pipe 15.

By reason of its elasticity the inflatable-lip seal may be applied to surfaces which are not planar: cylinders, for example, and it goes without saying that this seal may be moulded so that it is applicable to a support having a particular surface.

It is clear that the lips 2 may display the shape as shown in FIG. 2 in order to fit externally against a pipe or shaft 15, or the shape shown in FIG. 3 for fitting internally against the pipe 8.

When the pressure of the medium in which the elements being sealed by the inflatable-lip seal are immersed is high and the difference between the outside diameter of the supporting part 7 and the inside diameter of the pin 8 is relatively large, steel blades may be added to the conical peripheral surface of the lip 2 to prevent turning back of the lip at the periphery of the support 7.

Finally, when the material of the seal has a high resilience, a small reinforcement 19 may be provided at the root of the lip, which favours its folding at the time of inflation. Any flexible material may be employed, e.g. polyvinylchloride, polyurethane, neoprene, natural rubber, and the joint may be cloth-covered or not. The diaphragm may be manufactured independently of the body and lip of the seal and be connected and glued by cold vulcanizing the body and lip. It may also extend beyond the annular body 1 itself, the inflatable chamber then being partially bounded by the support 7. In any case the seal may be protected by a housing 20 the axial section of which is profiled to serve to guide the pipe 8 or 15 onto which the seal is to be applied, the housing or similar structure being mounted on the support 7.

The inflatable-lip seal may be applied to all the fields of application of lip-seals and especially to connections between pipes and tanks, of shafts which revolve or move longitudinally through a housing, the pressures being exerted either from the outside of the tank or on the contrary from the inside, for example, when the latter is under vacuum. It may also be used as the lip-seals edging a skirt which gets flattened by hydrostatic pressure against a plane annular surface.

There is thus provided a lip-seal with which introduction of the pipe or shaft may be carried out without particular precautions even in a medium where a high pressure prevails, as this operation brings about neither the risk of damaging the seal nor the risk of defective lapping of the pipe or shaft following an insignificant advance of the pipe into the lip. Moreover, being no longer dependent upon the original diameter of the seal before deformation, one may provide lips of larger dimensions ensuring in their final position better tightness. Similarly, having the possibility of applying the lip to any place on the pipe or the shaft after a shift of any length of the pipe with respect to the seal, any kind of clearance may be arranged between the outside diameter of the part bearing the seal and the inside diameter of the pipe to which the lip is applied. That is, this clearance no longer needs to be very narrow as in the case of the use of known lip-seals. To avoid entry of the seal into the gap separating the supporting part and the pipe it is sufficient to reinforce the seal.

Introduction of a pipe or a shaft into the lip-seal is facilitated by giving the profile of the deformed lip a rounded shape. In this way advantage may be taken both of the reduction in diameter of the seal and of the shape of the deformed profile which favours the sliding and guidance of the pipe or the shaft which is being introduced into the seal.

The reliability of the seal is increased by taking advantage of the zones of anchorage of the seal to limit the deformation of the seal and take advantage of this anchorage to exert on it under the action of inflation a tension intended to raise the edges of the lip.

Thus, having selected an appropriate material resistant to tension, one is certain of avoiding any detaching of the seal during the operation of inflation.

What is claimed is:

1. A lip-seal for sealing the junction between a pipe or the like projecting through an opening of larger diameter than the pipe within a flange or the like, said lip-seal comprising:
    a flange with an opening; an annular body mounted to said flange and coaxial of said flange opening; a flexible sealing lip carried by said annular body and projecting radially inwardly of said annular body inner periphery at an angle to the plane normal to the seal axis; means interposed between said annular body and said lip, defining an inflatable chamber, said means for defining said inflatable chamber comprising a diaphragm more flexible than the sealing lip, fixed at one edge to the inner peripheral edge of said lip and at an angle lesser than the lip angle, and at the other edge to said annular body, said inflatable chamber being defined between said diaphragm, said lip and said body; passageway means for fluid communication with said chamber; and which said chamber when inflated modifies the profile of said sealing lip and moves the peripheral edge of said sealing lip radially outward.

2. The lip-seal as claimed in claim 1, wherein an annular plate bears on the edge of said diaphragm and fixes said annular body to said flange about said flange opening.

3. The lip-seal as claimed in claim 1, wherein said lip is integrally molded with said annular body and wherein said passageway means comprises annular body passageways and said annular body further includes other passageways for receiving screws for fixing said annular body to said flange, and wherein said passageways for fixing said annular body to said flange are located radially outwardly of that portion of said annular body which carries said means defining said inflatable chamber.

4. A lip-seal as claimed in claim 3, wherein said passageway for communication with said chamber passes through said body adjacent the root of said lip.

5. The lip-seal as claimed in claim 1, wherein at least a portion of said diaphragm is attached to at least one of said body and said lip by gluing.

6. The lip-seal as claimed in claim 1, wherein said lip is bounded by two mutually inclined surfaces defining a cone-shaped lip such that on inflation of said chamber the tapering portion of said lip curves radially inward and wherein the external inclined surface of its thicker base portion preserves its original inclination in the direction opposite to the inclination of the tapering portion with respect to a direction parallel with the axis of the seal.

7. A lip-seal as claimed in claim 1, wherein said diaphragm is moulded integrally with said body and lip.

8. A lip-seal as claimed in claim 1, wherein said diaphragm is fixed to said lip by cold-vulcanizing.

9. A lip-seal as claimed in claim 1, wherein said diaphragm is cloth-covered.

10. A lip-seal as claimed in claim 1, including a structure to be mounted on the one part for protecting the diaphragm, said structure having an axial section profiled to serve for guiding the other part to which said lip is to be applied.

11. A lip-seal as claimed in claim 1, wherein said lip includes steel blades on its circumference.

12. A lip-seal as claimed in claim 1, wherein the peripheral edge of said body remote from said lip is bordered by a rigid structure.

13. A lip-seal as claimed in claim 1, wherein the root of said lip has on its inner surface bounding said chamber a reinforcement favouring its folding on inflation of said chamber.

* * * * *